(12) United States Patent
Rigel

(10) Patent No.: US 6,957,847 B2
(45) Date of Patent: Oct. 25, 2005

(54) TRUCK WITH PICKER CRANE AND SLEEPER UNIT FOR EXTENDED DUTY

(76) Inventor: Randy Lee Rigel, Site 1, Box 11, RR1, Strathmore, Alberta (CA) T1P 1J6

( * ) Notice: Subject to any disclaimer, the term of this patent is extended or adjusted under 35 U.S.C. 154(b) by 0 days.

(21) Appl. No.: 10/783,754

(22) Filed: Feb. 20, 2004

(65) Prior Publication Data

US 2005/0184558 A1  Aug. 25, 2005

(51) Int. Cl.[7] ............................................. B06R 27/00
(52) U.S. Cl. ........................ 296/190.02; 296/190.01; 296/190.08; 296/190.1; 296/190.11; 296/37.6; 180/89.12
(58) Field of Search ...................... 296/190.01, 190.02, 296/190.08, 190.11, 37.6, 190.1; 180/89.1, 180/89.12; 414/498, 491, 520, 547, 550, 414/543, 541, 561

(56) References Cited

U.S. PATENT DOCUMENTS

| 3,092,367 | A |   | 6/1963  | Selby ........................ 254/139.1 |
|-----------|---|---|---------|------------------------------------------|
| 3,958,702 | A |   | 5/1976  | Hand ............................ 214/38 |
| 4,049,238 | A |   | 9/1977  | Brown .......................... 254/139 |
| 4,078,818 | A |   | 3/1978  | Donnelly ...................... 280/415  |
| 4,121,684 | A | * | 10/1978 | Stephens et al. ........ 296/190.02       |
| 4,383,792 | A |   | 5/1983  | Seabloom et al. ........... 414/563       |
| 4,438,825 | A | * | 3/1984  | Stephens ................ 296/190.02       |
| 4,948,326 | A |   | 8/1990  | Bedard ........................ 414/541   |
| 4,991,906 | A | * | 2/1991  | Fingerle ................... 296/180.2    |
| 5,083,834 | A | * | 1/1992  | Moffatt et al. ......... 296/190.02       |
| 5,280,984 | A | * | 1/1994  | Paul et al. ............. 296/190.02      |
| 5,310,239 | A | * | 5/1994  | Koske et al. ........... 296/190.02       |
| 5,402,898 | A |   | 4/1995  | Lute ........................... 212/255  |
| 5,542,812 | A |   | 8/1996  | Grove et al. ................. 414/543    |
| 5,636,699 | A |   | 6/1997  | Pitman ........................ 175/203   |
| 6,155,632 | A | * | 12/2000 | Fujimoto ............... 296/190.08        |
| 6,547,506 | B1|   | 4/2003  | Jacob .......................... 414/498  |
| 6,719,361 | B1| * | 4/2004  | Adams et al. ......... 296/190.01         |
| 6,756,693 | B2| * | 6/2004  | Kennedy ..................... 290/1 A    |

\* cited by examiner

*Primary Examiner*—Lori L. Coletta
(74) *Attorney, Agent, or Firm*—Gene Scott; Patent Law and Venture Group

(57) ABSTRACT

A commercial truck has a cab, a flatbed, and provides a space between the cab and flatbed, wherein an auxiliary fuel tank is mounted on a frame of the truck. A sleeper unit is positioned on, and supported by, the auxiliary fuel tank, the sleeper unit adapted for being accessed directly from the cab. A picker crane is mounted on the frame of the truck behind the auxiliary fuel tank and the sleeper unit and within the space between the cab and the flatbed.

10 Claims, 4 Drawing Sheets

TRUCK WITH PICKER CRANE AND SLEEPER UNIT FOR EXTENDED DUTY

BACKGROUND OF THE INVENTION

Incorporation by Reference

Applicant(s) hereby incorporate herein by reference, any and all U.S. patents and U.S. patent applications cited or referred to in this application.

1. Field of the Invention

This invention relates generally to commercial trucks and more particularly to truck configurations adapted for long-range and extended duty in loading and hauling commercial consignments.

2. Description of Related Art

The following art defines the present state of this field:

Selby, U.S. Pat. No. 3,092,367 describes a truck and track combination having a forward cab, a truck frame and a cab guard mounted rearwardly of said cab on the truck frame, a boom assembly comprising, folding upper and dower pivoted sections of a boom means pivotally mounted on the rear end of said truck frame for overhanging projection rearwardly and upwardly from the truck frame in a rigidly extended load sustaining position, power operated means mounted on the truck frame and operatively connected to the boom means lower section for pivotally retracting the boom means in an extended condition against the cab guard and subsequently operative in cooperation with the cab guard to further retract the boom means into a folded condition with the pivot means of said sections disposed adjacent said cab guard.

Hand, U.S. Pat. No. 3,958,702 describes a mobile load handling apparatus for handling elongated loads including an elongated platform supported at an elevation above ground, and a crane at each end of said platform for alignment with a corresponding end of an elongated load. Each crane has an elongated mast with a base by which it is attached to the platform for radial movement thereon between one position in which it is disposed substantially horizontally across the corresponding end of the platform and another position in which it is disposed substantially erectly at one side of the platform. A jack is interconnected between the mast and the platform and is extendable and contractible to move the mast between its two positions. The mast has a free end opposite the base and an arm attached thereto at the free end for swinging thereon between an outstretched position in which it is in substantial axial alignment with the mast and a jack-knife position in which it forms a sharply acute angle with the mast. A further jack is interconnected between the mast and the arm and is extendable and contractible to move the arm between the two positions aforesaid relative to the mast, the arm having a free end remote from its point of attachment to the mast and an extension at the free end which is retractably propellable to lengthen and shorten the arm. A double-ended beam is suspended from the extension and is balanced to retain a substantially horizontal orientation irrespective of the positioning of the arm, and each end of the beam has locking devices cooperable with the top of said load. The height of the platform and the proportions of the mast and arm are scaled to enable stacking of two standard freight containers one on top of the other on one side of the platform and loading of one such container on a vehicle of standard height on the other side of the platform.

Brown, U.S. Pat. No. 4,049,238 describes a truck crane for use on a vehicle frame that includes a support frame including a pair of spaced apart support members, with means for pivotally mounting the support members at substantially one end thereof between operative and inoperative positions. To obtain various positions an extension device is cooperatively associated with the support members and includes a pair of extension members, each extension member and a respective support member being interfitted one within the other and being slidable and longitudinally adjustable relatively to its support member, so as to be adjustable between extended and retracted positions. Bridging means interconnecting the extension members at the free end is provided with releasably interconnecting means for retaining the support members and the extension members in longitudinally aligned extended and retracted positions. Hydraulic means is pivotally connected at one end thereof to the vehicle frame and at the opposite end pivotally connected to the support members, so as to support the support frame in selected operative positions. Winch means is contained on the vehicle, and cable means having a hook at one end extending over the bridging means and connected to the winch means at the opposite end thereof is utilized.

Donnelly, U.S. Pat. No. 4,078,818 describes a convertible vehicle in which a flatbed unit can be used to convert a tractor into a flatbed truck when the tractor is not used for towing a trailer unit.

Seabloom et al., U.S. Pat. No. 4,383,792 describes a detachable crane or hoist for mounting on the bed of a pickup truck or other vehicle that is constructed from tubular members of square cross section. The structure is readily secured to the truck bed and the boom may be extended to selected lengths with guy lines arranged for the length selected. The boom is pivotally mounted on a roller mounted base and is easily erected and dismantled. A post or column is provided to guide the boom during vertical movement and is extendable to provide raised positions for guy lines and for the hoisting cable. A removable stop on the post provides a secure rest for the boom in its collapsed and lowered position. Short anchoring bars horizontally adjustable in sleeves secured to the rearward end of the structure are used for securing the structure to the truck bed. These bars may be replaced by long bars fitting the same sleeves and also sleeves in the forward end of the structure. The long bars are effective for facilitating removal of the crane from the truck.

Bedard, U.S. Pat. No. 4,948,326 describes a load lifting attachment suitable for mounting on a truck or other vehicle frame, which can handle, load, unload, lift and transport various loads including containers and pallets. The attachment is pivotally mounted behind a truck cab by mounting on a pair of support beams, which in turn are pivotally mounted to the truck frame. The attachment is pivoted to a raised position away from the rear of the truck frame when not in use permitting unimpeded connection of a trailer or the like to the truck frame by a fifth wheel or other trailer-attaching device. When not in use, the load lifting attachment may be secured to the truck cab. When in use, the attachment is pivoted to a lowered position.

Lute, U.S. Pat. No. 5,402,898 describes a truck mounted crane assembly including a turntable lock, a boom rest which interacts with the piston and cylinder device, and a swing away hoist mount. The turntable lock includes a pin which is manually retractable upon rotation of a handle from a position preventing relative rotation between a turntable and a pedestal to a position allowing such relative rotation and which can be secured in the first and second positions. The boom rest is mounted on the boom and rests on the cylinder of the piston and cylinder device when the boom is lowered to a predetermined position, thus taking much of the pressure off the piston. The boom rest is movable from a position in which it is capable of supporting the boom to a position in which it is incapable of supporting the boom and in which the boom is thus lowerable below the predetermined position. The provision of the turntable lock and boom rest obviates the need for a cradle rest for the boom. Finally, the hoist mount receives the hoist, is connected to the boom, and is movable under actuation of the hoist or telescoping of the end of the boom from a first, working position to a second position allowing access to the interior of the front end of the boom.

Grove, et al., U.S. Pat. No. 5,542,812 describes a truck mounted crane assembly including a turntable lock, a boom rest which interacts with the piston and cylinder device, and a swing away hoist mount. The turntable lock includes a pin which is manually retractable upon rotation of a handle from a position preventing relative rotation between a turntable and a pedestal to a position allowing such relative rotation and which can be secured in the first and second positions. The boom rest is mounted on the boom and rests on the cylinder of the piston and cylinder device when the boom is lowered to a predetermined position, thus taking much of the pressure off the piston. The boom rest is movable from a position in which it is capable of supporting the boom to a position in which it is incapable of supporting the boom and in which the boom is thus lowerable below the predetermined position. The provision of the turntable lock and boom rest obviates the need for a cradle rest for the boom. Finally, the hoist mount receives the hoist, is connected to the boom, and is movable under actuation of the hoist or telescoping of the end of the boom from a first, working position to a second position allowing access to the interior of the front end of the boom.

Pitman, U.S. Pat. No. 5,636,699 describes a self-propelled hauling vehicle. The vehicle has three main axles with two wheels per axle for a total of six wheels. Optional wheels can be added onto each axle for increased stability and also to reduce the pressure per wheel. The vehicle is sized to have a width of approximately thirty-four inches allowing the vehicle to fit through narrow spaces. Optional tracks can cover the wheels when needed. An extension crane with extendable hydraulic cylinders and pistons can raise and lower loads such as telephone poles and the like. The invention includes a storage platform thereon. The crane can include a conventional winch and pulley assembly with hooks. Optionally an auger can be suspended and operated by the end of the crane. The vehicle can include extendable stabilizer arms and foot pads for increased stability. The arms can be detachable when not used. An operator can control the vehicle by walking behind the vehicle and controlling the vehicles speeds, and other functions.

Jacob, U.S. Pat. No. 6,547,506 describes a truck having either a segmented body configured to receive a plurality of form fitted containers or a substitute body that can be interchangeably mounted on the chassis of the truck. The truck is also provided with a multi-purpose crane and a plurality of hydraulic valve banks mounted to the chassis of the truck, whereby the crane and hydraulic tools can be operated simultaneously. The truck may also be configured with various other features such as a hose reel or a snowplow.

Our prior art search with abstracts described above teaches: a folding boom, a mobile load handling apparatus, a porta-crane, a convertible flatbed truck, a crane for detachable mounting on a truck bed, a load lifting attachment mounted on a truck frame, a crane having a boom rest, a crane having swing away hoist mount, a mobile hauling vehicle, and a multi-task truck, but does not teach a flatbed truck with added gas tank configured below a sleeper unit forward of a compact picker crane. The present invention fulfills these needs and provides further related advantages as described in the following summary.

SUMMARY OF THE INVENTION

To fully understand the nature and value of the improvements comprising the present invention, and their relationship to the intended use of the improved truck of this invention, it is necessary to point out that there is a considerable commercial demand for small-lot, spot trucking services where either the pickup or drop-off point is not equipped with loading facilities, that is services for hauling relatively small consignments of commercial merchandise on short notice between non-trucker facilities and at budget prices. Also, a truck with its own loading capability need not use expensive commercial loading facilities, but is able to self-load. Because the truck can accommodate two drivers it is not limited to the 12 hour legal limit imposed on a single driver unit.

To accomplish its task the present invention uses a commercially available truck which is modified to carry a large fuel supply, to pick and place a considerable load and to enable continuous and extended use with little or no downtime. This is accomplished by fitting the truck with additional fuel tanks, with a picker crane and with a sleeper unit so that the truck may be operated continuously if desired. The present invention teaches certain benefits in construction and use which give rise to the objectives described below.

The present invention is a commercial truck apparatus having a cab and a flatbed, and it is modified to provide a space between the cab and flatbed for accommodating an auxiliary fuel tank mounted on a frame of the truck apparatus within this space. A sleeper unit is positioned on, and supported by, the auxiliary fuel tank, and is adapted for being accessed directly from the cab so that driver switchover may be accomplished without stopping the vehicle. A picker crane is mounted on the frame of the truck behind the auxiliary fuel tank and the sleeper unit and within the space between the cab and the flatbed. When the truck is dispatched, it is able to arrive at the point of pickup in the shortest amount of time, it is able to pick up the consignment and place it on the flat bed without the need to use third part loading services that may delay the hauling mission and involve added costs, and then move to the requested destination immediately and in the shortest amount of time and to dispatch its load immediately upon arrival, again without the use of third party unloading facilities which may delay the delivery. As can be seen in the above description, the present invention is designed to provide hauling services at the least cost, and in the fastest time. The added fuel tank enables the vehicle to haul over greater distances without stopping for fueling as compared to standard trucks. The use of a sleeper unit also allows for non-stop hauling as two drivers may be used with driver change-off so that continuous 24 hours per day hauling may be accomplished with one driver sleeping as needed while the alternate driver continues to drive the vehicle. The most important element of the present invention is the picker crane which enables the loading and unloading of freight without relying upon third party equipment, the scheduling thereof and the added cost of its use.

A primary objective of the present invention is to provide an apparatus and method of use of such apparatus that yields advantages not taught by the prior art.

Another objective is to provide such an invention capable of experiencing down time for neither loading operating fuel nor replacement drivers.

A further objective is to provide such an invention capable of operating in the field without benefit of loading or unloading facilities.

A still further objective is to provide such an invention capable of conveniently carrying flat bed cargo fastening equipment.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 1:
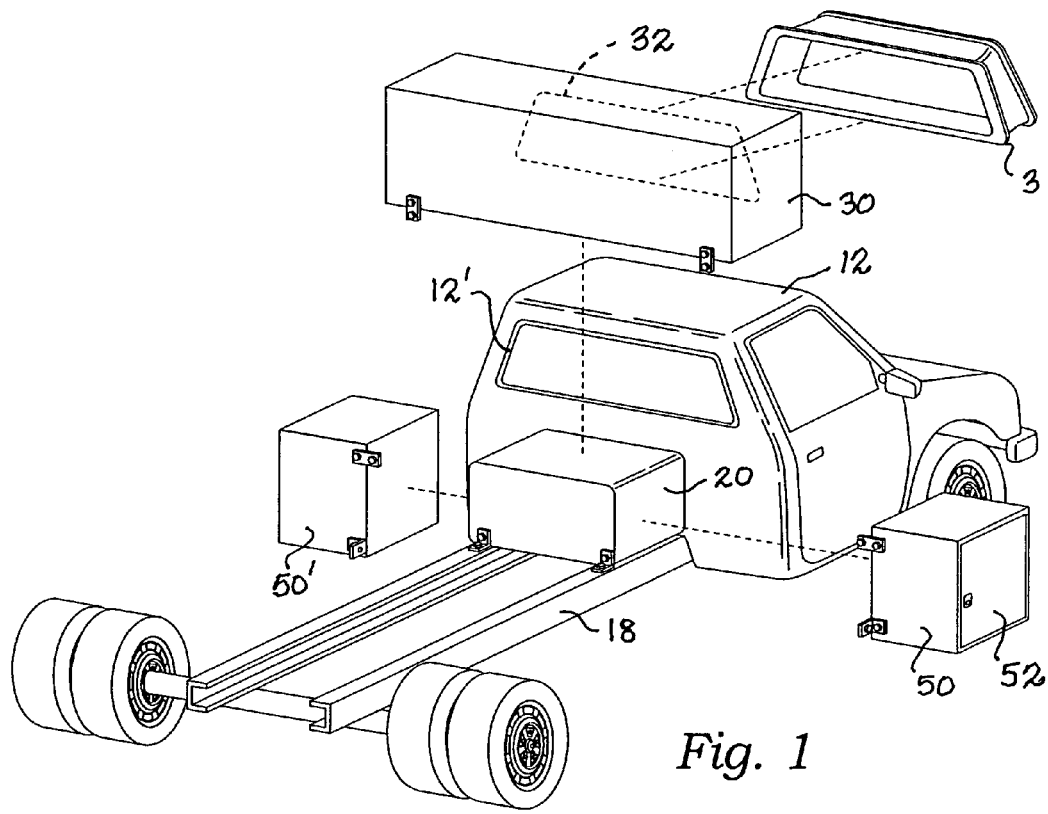
FIG. 1 is an exploded perspective view of the invention showing a sleeper box, storage cabinets and an auxiliary fuel tank.
Figure 2:
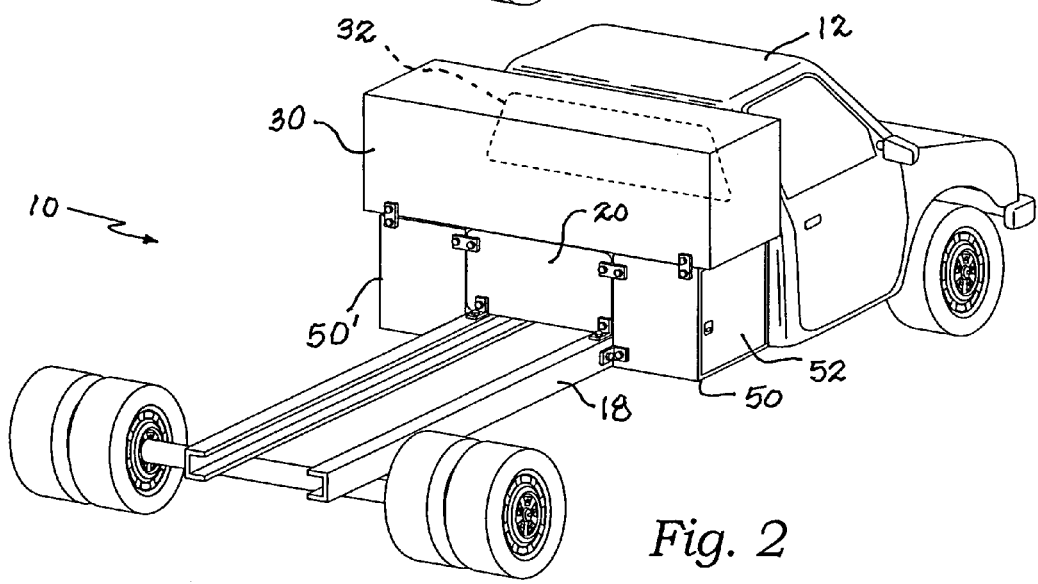
FIG. 2 is similar to FIG. 1, showing the several elements as assembled.
Figure 3:
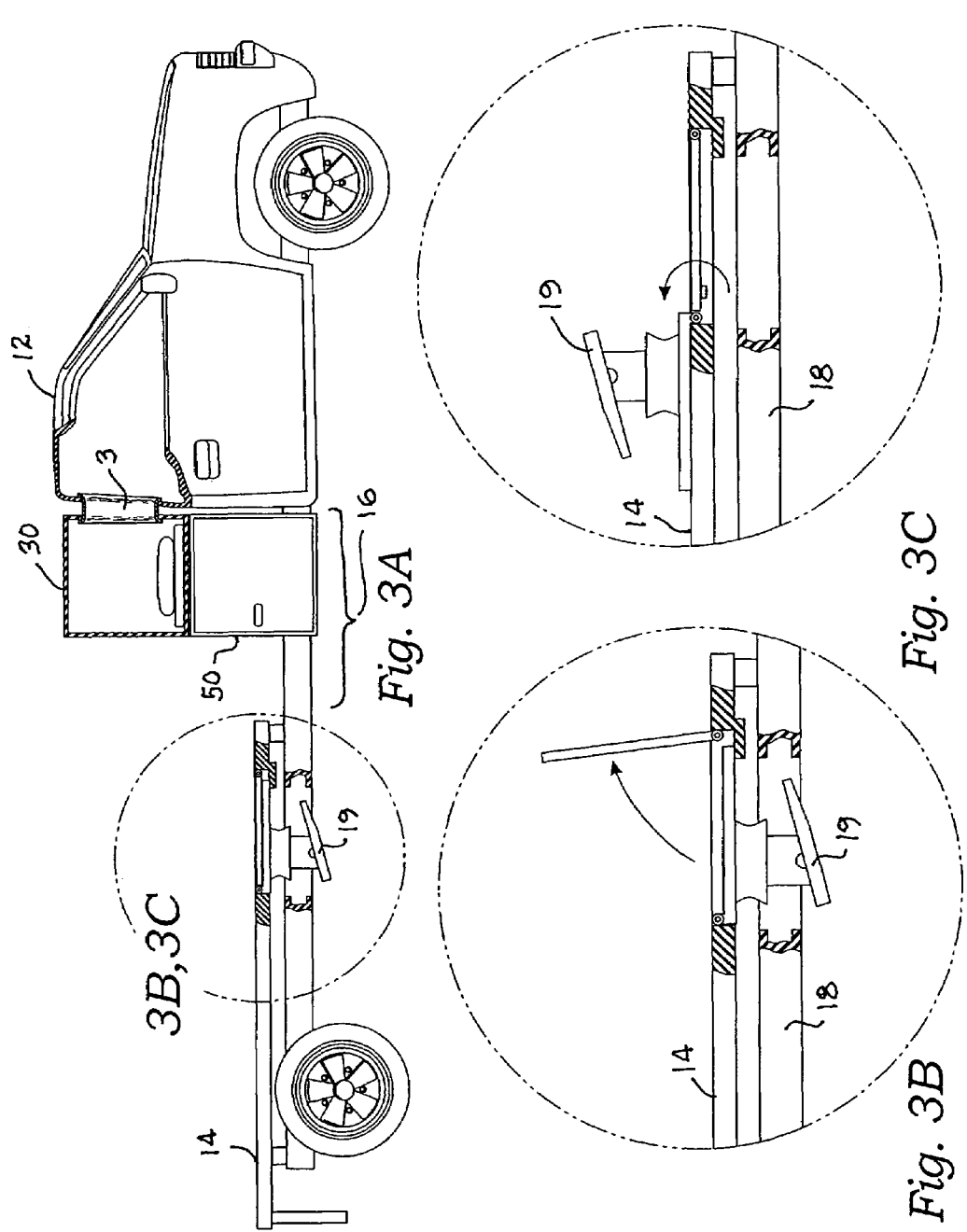
FIG. 3A is a side elevational view with partial cutaway portions showing a fifth wheel assembly in a retracted position and a window connector.
FIGS. 3B and 3C are enlarged views taken from FIG. 3A showing a fifth wheel hatch opening and the fifth wheel in an extracted position ready to receive a trailer.

The present invention is a commercial truck apparatus 10 having a cab 12, a flatbed 14, and a space 16 between the cab 12 and flatbed 14 as best seen in the FIG. 3A. This modified standard truck provides improvements which comprise the present invention and include an auxiliary fuel tank 20 mounted on a frame 18 of the truck apparatus 10 within the space 16 between the cab 12 and the flatbed 14. A sleeper unit 30 is positioned on, and supported by, the auxiliary fuel tank 20 thereby raising it to a level whereby a window 32 in the sleeper unit 30 is opposite a rear window 12' in the cab 12. The sleeper unit 30 therefore is adapted for being accessed directly from the cab 12 so that the window 32 in the sleeper unit 30 is joined by a window boot 3 to the rear window 12' of the cab 12 and the boot is fitted around both so that movement by a driver of the apparatus 10, between the cab 12 and the sleeper unit 30 is possible. A picker crane 40 is bolted to the frame 18 of the truck apparatus 10 behind the auxiliary fuel tank 20 and the sleeper unit 30 and within the space 16 between the cab 12 and the flatbed 14. See FIGS. 4 and 5.

A pair of auxiliary compartments 50, 50' are mounted in spaced apart positions lateral to the auxiliary fuel tank 20 and below the sleeper unit 30, that is, the sleeper unit 30 rests on the fuel tank 20 as well as the compartments 50, 50'. The auxiliary compartments 50, 50', which may hold accessories or tools, provide access doors 52 accessible from the side of the truck apparatus 10.

Preferably, retractable lateral stabilizers 60, of any well known type, are positioned on both sides of the picker crane 40 and are able to be positioned into contact with the road surface so as to prevent the truck apparatus 10 from tilting or swaying when loads are handled by the picker crane 40.

Figure 4:
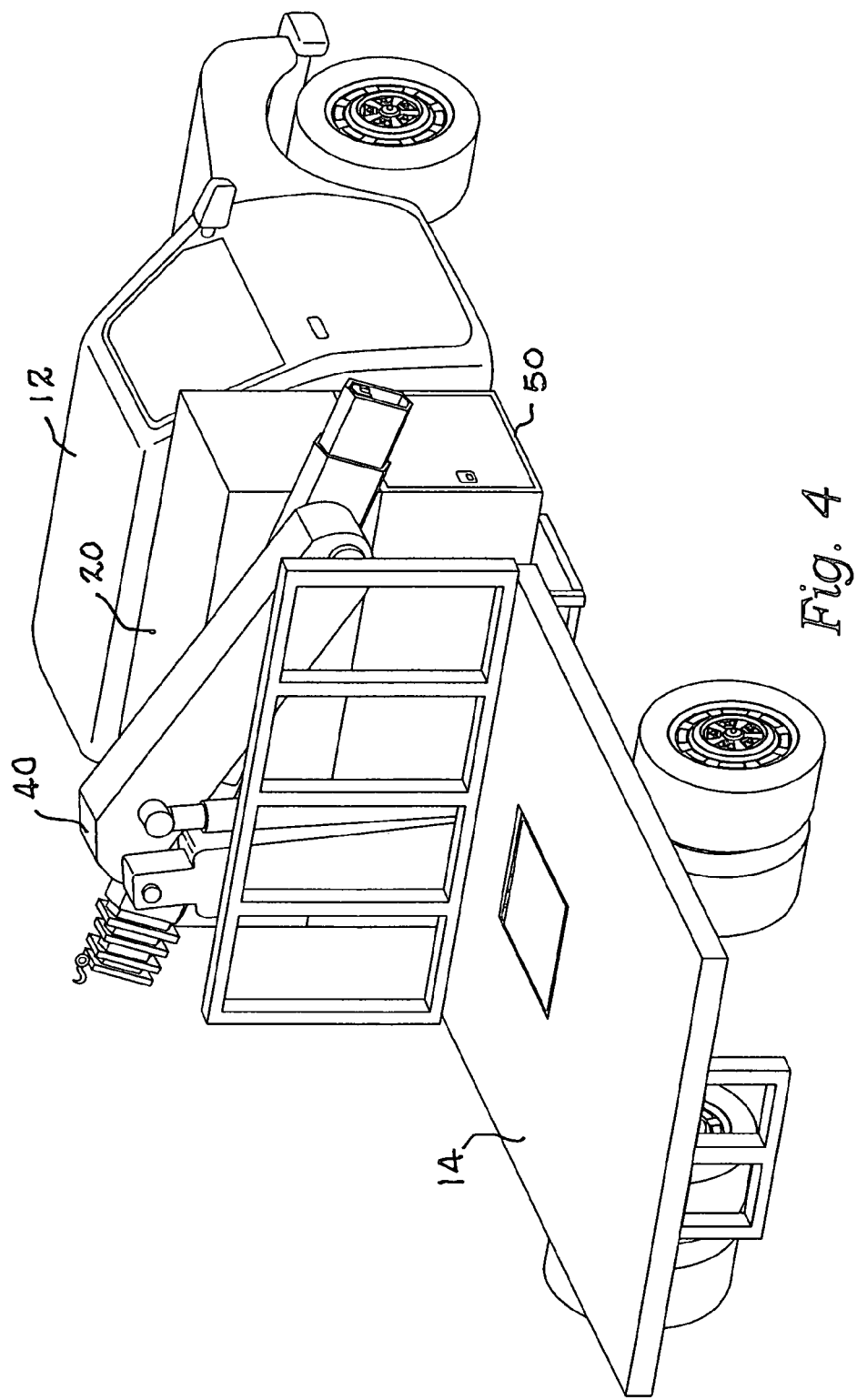
FIG. 4 is a rear, three-quarter perspective view of the invention showing a flat bed thereof and a picker crane as retracted.
Figure 5:
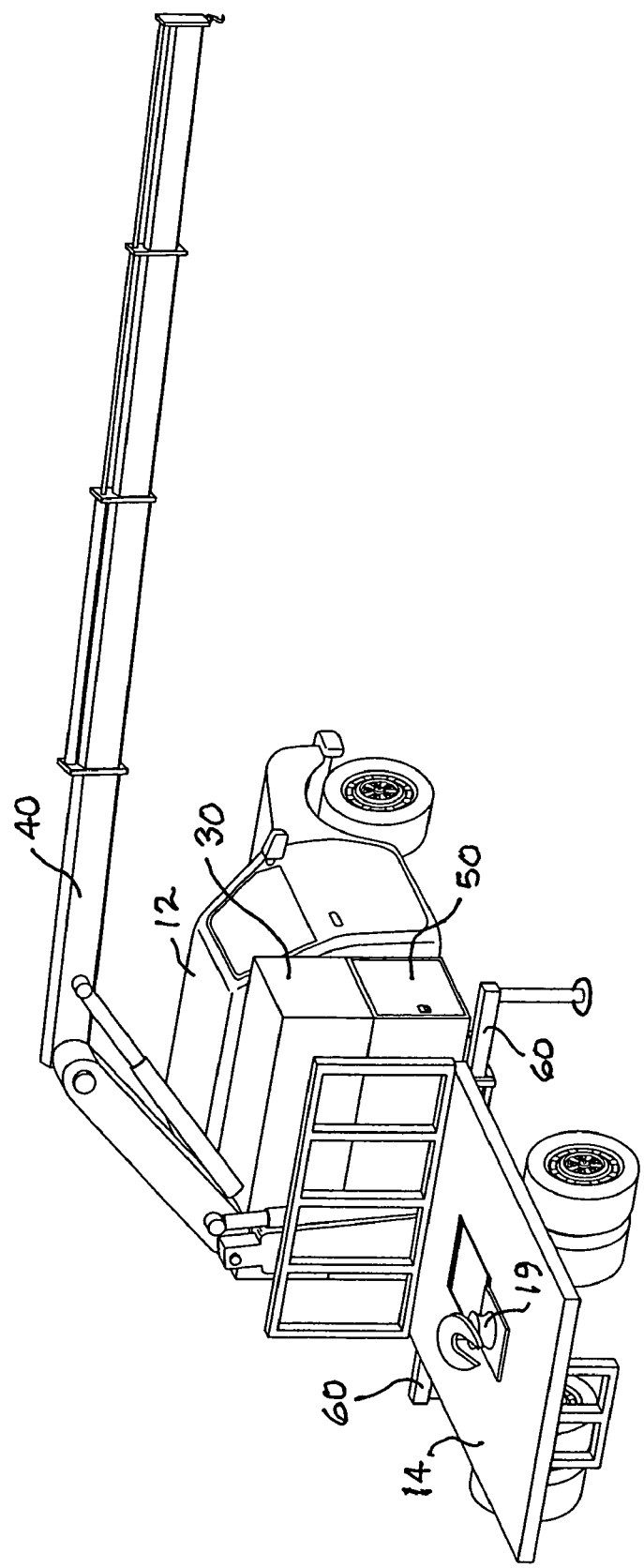
FIG. 5 is similar to FIG. 4 showing the fifth wheel as extracted and the picker crane as extended.

Preferably the truck used in this invention is a Ford Motor Company model 550 XLT 4×4 cab and chassis including flat bed 12 as shown in the figures. The flat bed 12 has a convertible fifth-wheel 19 built into it so that a trailer (not shown) may be attached to the truck 10. The use of a convertible fifth-wheel 19, as is well known in the art, provides for use of the full flat bed surface area when, the fifth-wheel 19 is not in use. The picker crane 40 is operated hydraulically and is preferably from Caytec Equipment, Ltd. of Calgary, Canada; their model number GA321128 which weighs approximately 1000 kg. This crane is about 2' wide and 7'6" high when fully folded as shown in FIG. 4. It is bolted to the frame 18 using ⅜ inch hardware. The picker crane 40 has a maximum reach of 28'7" and at that extension has a gross maximum lifting capacity of 1210 pounds. Further lifting capacities depend upon the crane's reach as follows; 1630 pounds at 22'10", 3460 pounds at 11'10" and 6280 pounds at 6'7".

When extended, the stabilizers 60 are 6'9" apart and each has a one foot total vertical adjustment. The sleeper unit 30 is 30 inches wide and slightly longer than the cab 12 is wide as shown in the figures. It contains an insulated bunk and interior lights as are known in the art.

The enablements described in detail above are considered novel over the prior art of record and are considered critical to the operation of the instant invention and to the achievement of the above described objectives. The words used in this specification to describe the invention and its various embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of this described invention and its various embodiments are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. In a commercial truck apparatus having a cab and a flatbed, and a space between the cab and flatbed, the improvement comprising: an auxiliary fuel tank mounted on a frame of the truck apparatus within the space between the cab and the flatbed; a sleeper unit positioned on, and supported by, the auxiliary fuel tank, the sleeper unit adapted for being accessed directly from the cab; and a picker crane mounted on the frame of the truck behind the auxiliary fuel tank and the sleeper unit and within the space between the cab and the flatbed.

2. The apparatus of claim 1 further comprising a pair of auxiliary compartments mounted in spaced apart positions lateral to the auxiliary fuel tank and below the sleeper unit.

3. The apparatus of claim 2 wherein the auxiliary compartments provide access doors accessible from the side of the truck apparatus.

4. The apparatus of claim 1 further comprising a lateral stabilizer positioned on at least one side of the picker crane.

5. A commercial truck apparatus comprising: a sleeper unit positioned to the rear of a cab: the sleeper unit providing a window and boot joining a window in the cab for access to the sleeper unit directly from the cab; and a picker crane mounted on a frame of the truck behind the sleeper unit.

6. The apparatus of claim 5 further comprising at least one auxiliary fuel tank.

7. The apparatus of claim 6 wherein the at least one auxiliary fuel tank is positioned below the sleeper unit.

8. The apparatus of claim 5 further comprising at least one auxiliary compartment mounted lateral to the at least one auxiliary fuel tank and below the sleeper unit.

9. The apparatus of claim 8 wherein the at least one auxiliary compartment provides an access door accessible from the side of the truck apparatus.

10. The apparatus of claim 5 further comprising a lateral stabilizer positioned on at least one side of the picker crane.

* * * * *